United States Patent
Reid

(10) Patent No.: US 11,273,882 B2
(45) Date of Patent: Mar. 15, 2022

(54) HARD-SHELL MOTORCYCLE COVER ASSEMBLY

(71) Applicant: Rodgery Reid, Charlotte, NC (US)

(72) Inventor: Rodgery Reid, Charlotte, NC (US)

( * ) Notice: Subject to any disclaimer, the term of this patent is extended or adjusted under 35 U.S.C. 154(b) by 0 days.

(21) Appl. No.: 16/898,976

(22) Filed: Jun. 11, 2020

(65) Prior Publication Data

US 2021/0387689 A1 Dec. 16, 2021

(51) Int. Cl.
*E04H 6/00* (2006.01)
*B62J 19/00* (2006.01)

(52) U.S. Cl.
CPC .............. *B62J 19/00* (2013.01); *E04H 6/005* (2013.01)

(58) Field of Classification Search
CPC .............. E04H 6/04; E04H 6/005; B62J 19/00
See application file for complete search history.

(56) References Cited

U.S. PATENT DOCUMENTS

| | | | | |
|---|---|---|---|---|
| 3,861,092 A | * | 1/1975 | Dale | E04H 6/005 52/66 |
| 3,945,159 A | * | 3/1976 | Girnus, Sr. | E04H 6/005 52/66 |
| 4,306,390 A | | 12/1981 | Brown | |
| 5,265,385 A | | 11/1993 | Smith | |
| 5,369,920 A | | 12/1994 | Taylor | |
| 5,414,966 A | * | 5/1995 | Montoya | E04H 6/04 135/116 |
| 5,533,616 A | * | 7/1996 | Crowfoot | B65D 85/68 206/335 |
| 6,349,732 B1 | | 2/2002 | Cooper | |
| 7,966,774 B2 | * | 6/2011 | Kea, Jr. | B62H 3/00 52/66 |
| D781,209 S | * | 3/2017 | Houck | D12/402 |
| 2003/0097803 A1 | * | 5/2003 | Voorhees | B62J 19/00 52/66 |
| 2009/0307992 A1 | * | 12/2009 | Kea, Jr. | E04H 6/005 52/66 |

FOREIGN PATENT DOCUMENTS

| | | | | |
|---|---|---|---|---|
| CN | 111101738 A | * | 5/2020 | |
| FR | 2499617 A1 | * | 8/1982 | E04H 6/005 |
| GB | 2486653 A | * | 6/2012 | E04H 6/005 |
| WO | WO2005085052 | | 9/2005 | |

* cited by examiner

*Primary Examiner* — Christine T Cajilig

(57) ABSTRACT

A hard-shell motorcycle cover assembly includes a floor panel that is positionable on a support surface thereby facilitating a motorcycle to be rolled onto the floor panel. The floor panel is longitudinally elongated to accommodate a full length of the motorcycle. A shell is divided into a rear portion that is hingedly coupled to a front portion. The rear portion is positionable in an open position to facilitate the motorcycle to be driven onto the floor panel. Additionally, the rear portion is positionable in a closed position to enclose, and protect, the motorcycle on the floor panel. A biasing unit is coupled between the rear portion and the front portion for biasing the rear portion into the open position.

8 Claims, 5 Drawing Sheets

HARD-SHELL MOTORCYCLE COVER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to cover devices and more particularly pertains to a new cover device for protecting a motorcycle from impact damage, weather elements and sunlight.

(2) Description of Related Art Including Information Disclosed Under 37 CFR 1.97 and 1.98

The prior art relates to cover devices. The prior art discloses a variety of hard shell motorcycle covers that can be opened or closed. In one instance the hard shell is of single piece construction, while in another instance the hard shell has a pair of halves that are telescopically retractable. Additionally, the prior art discloses a hard shell motorcycle cover that comprises a plurality of modular panels. The prior art discloses a motorcycle garage that has a pair of doors and a hinged roof section for opening and closing the motorcycle garage. In no instance does the prior art disclose a hard shell motorcycle cover that comprises a fixed portion of a shell and a hinged portion of a shell.

BRIEF SUMMARY OF THE INVENTION

An embodiment of the disclosure meets the needs presented above by generally comprising a floor panel that is positionable on a support surface thereby facilitating a motorcycle to be rolled onto the floor panel. The floor panel is longitudinally elongated to accommodate a full length of the motorcycle. A shell is divided into a rear portion that is hingedly coupled to a front portion. The rear portion is positionable in an open position to facilitate the motorcycle to be driven onto the floor panel. Additionally, the rear portion is positionable in a closed position to enclose, and protect, the motorcycle on the floor panel. A biasing unit is coupled between the rear portion and the front portion for biasing the rear portion into the open position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
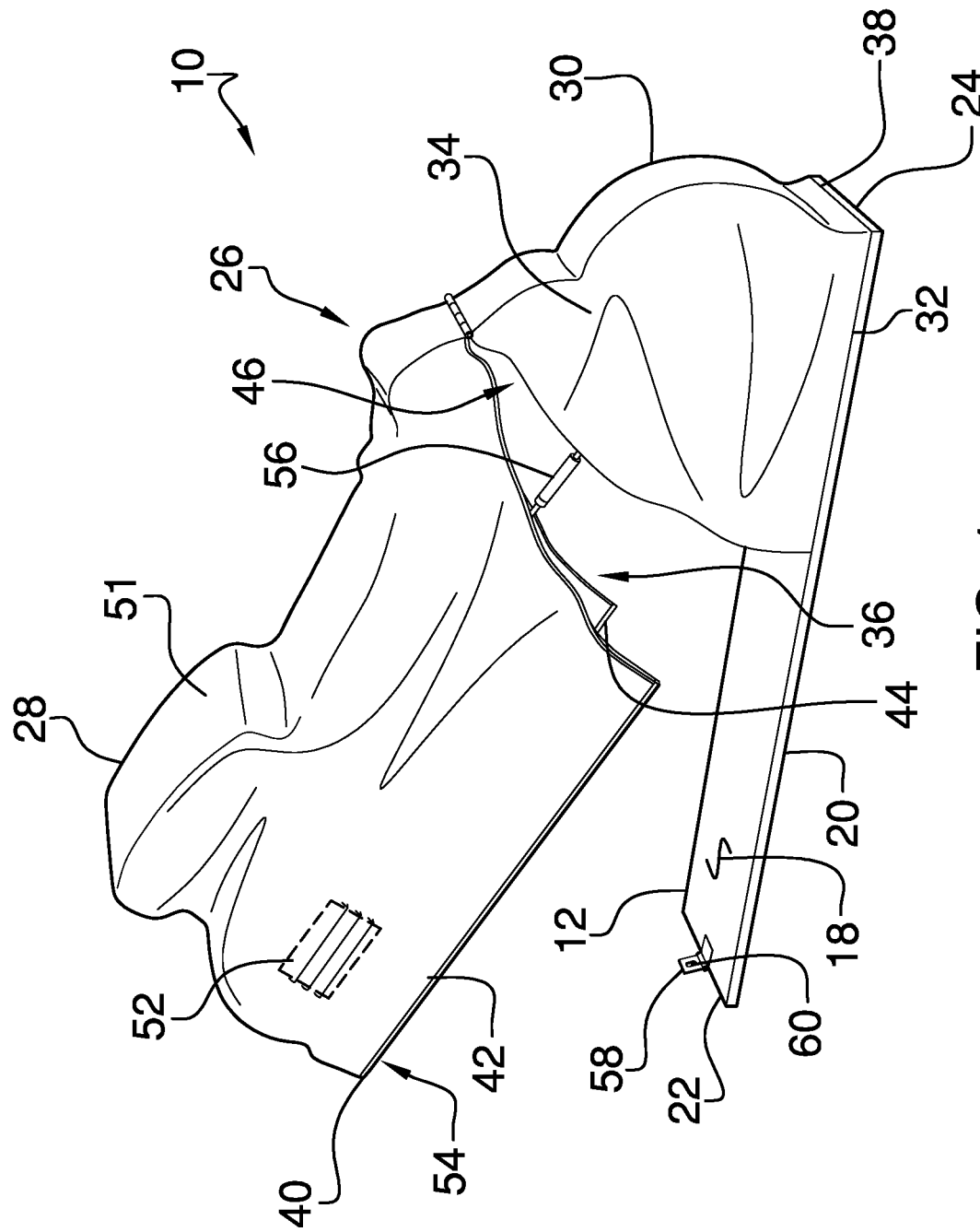
FIG. 1 is a perspective view of a hard-shell motorcycle cover assembly according to an embodiment of the disclosure.
Figure 2:
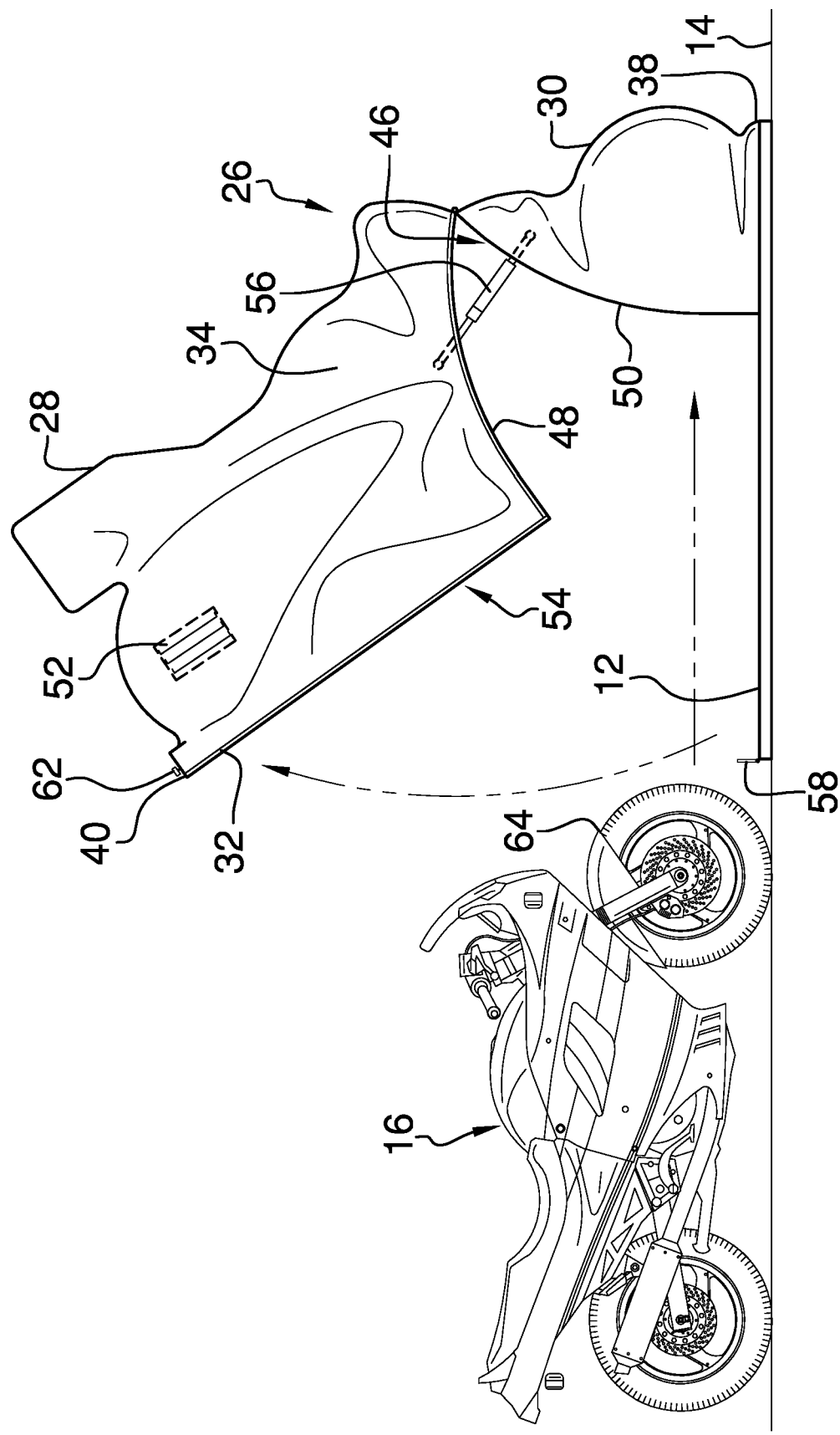
FIG. 2 is a right side view of an embodiment of the disclosure showing a rear portion of a shell being positioned in an open position.
Figure 3:
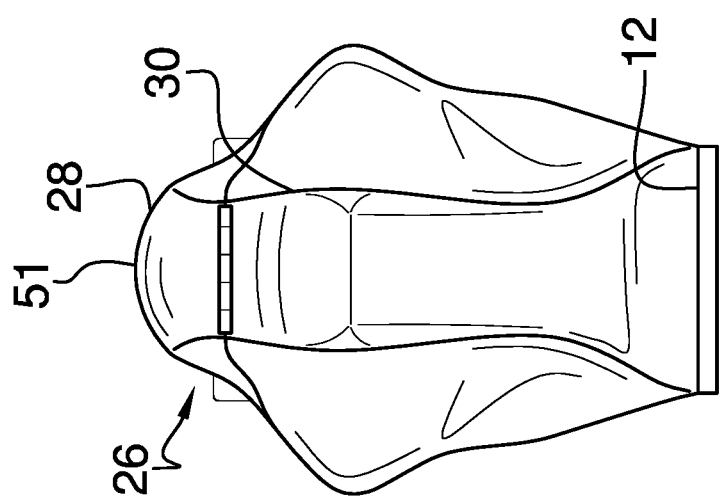
FIG. 3 is a front view of an embodiment of the disclosure.
Figure 4:
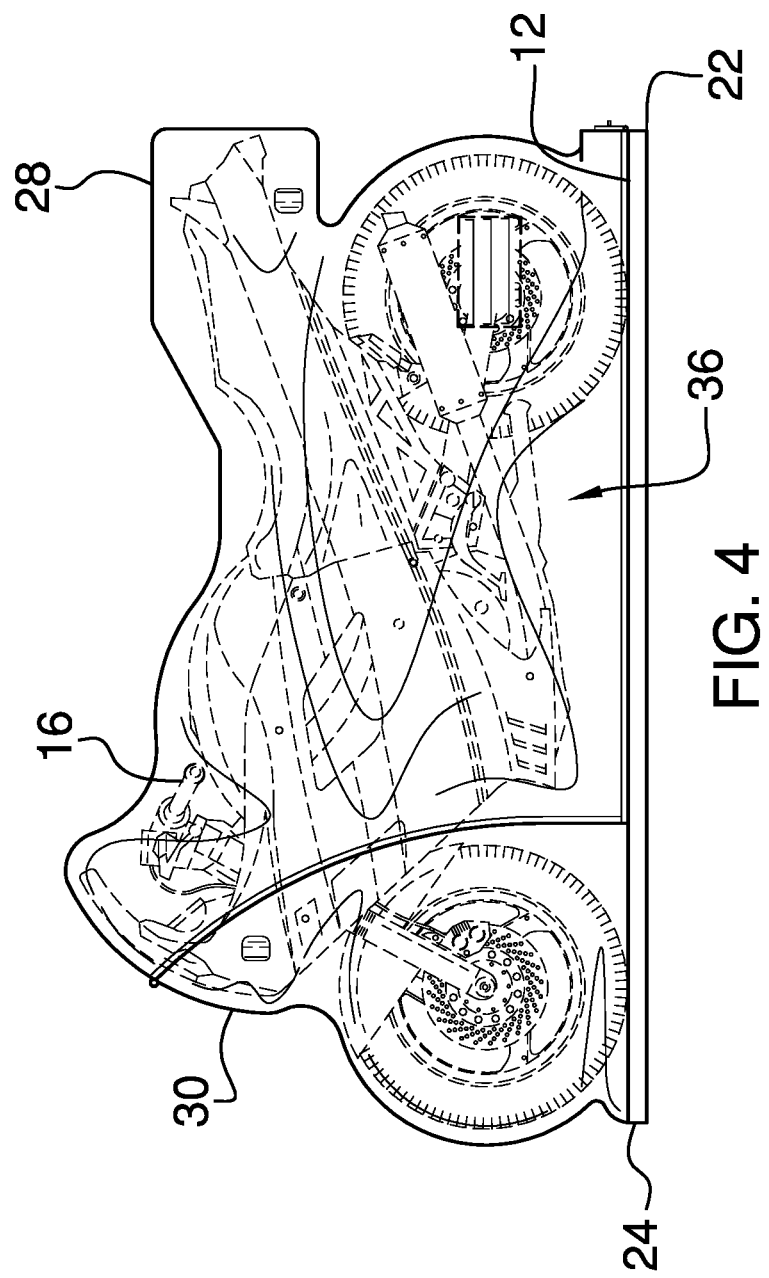
FIG. 4 is a left side phantom in-use view of an embodiment of the disclosure.
Figure 5:
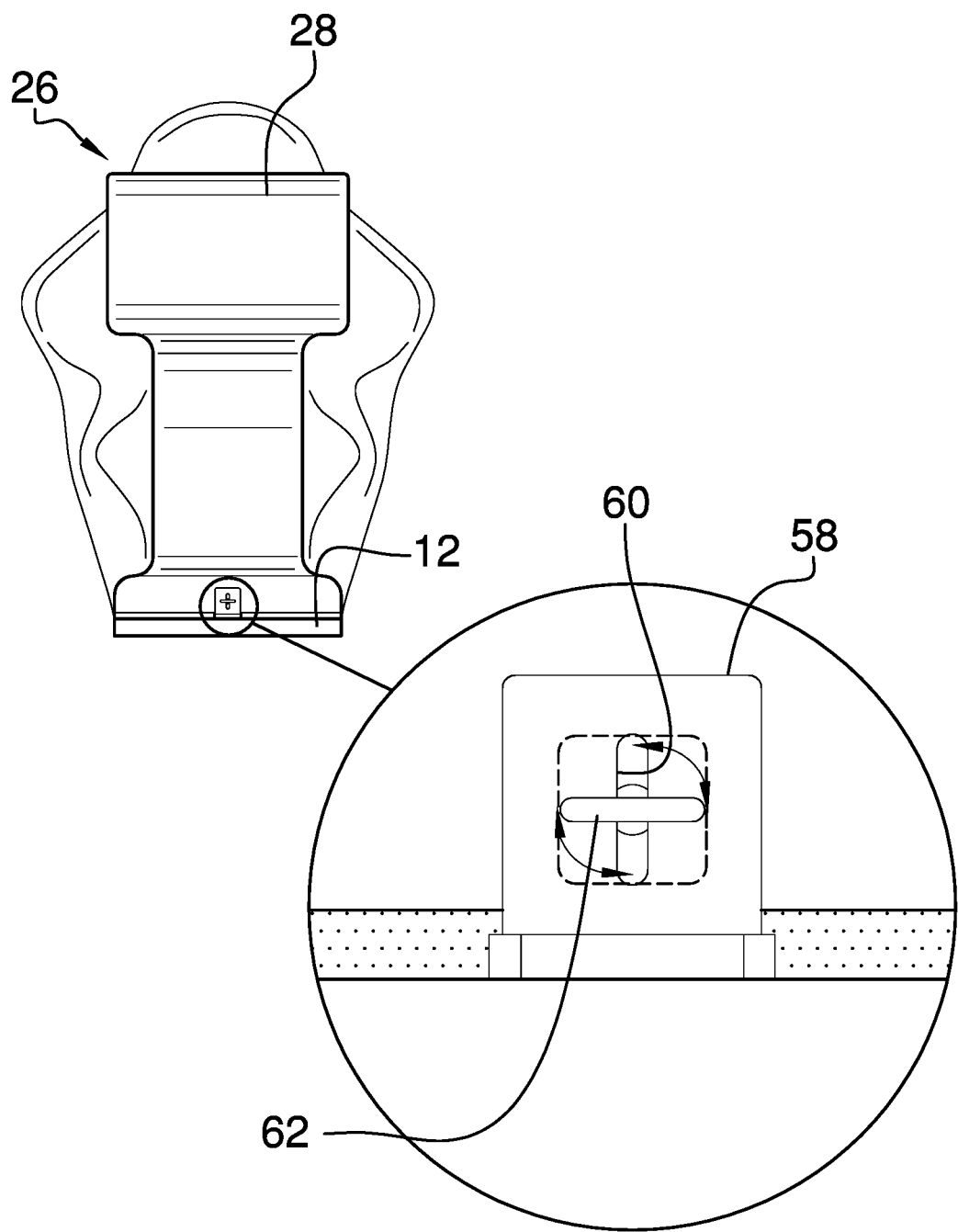
FIG. 5 is a detail view of an engagement and a closure of an embodiment of the disclosure.

With reference now to the drawings, and in particular to FIGS. 1 through 5 thereof, a new cover device embodying the principles and concepts of an embodiment of the disclosure and generally designated by the reference numeral 10 will be described.

As best illustrated in FIGS. 1 through 5, the hard-shell motorcycle cover assembly 10 generally comprises a floor panel 12 that is positionable on a support surface 14 thereby facilitating a motorcycle 16 to be rolled onto the floor panel 12. The floor panel 12 is longitudinally elongated to accommodate a full length of the motorcycle 16. The motorcycle 16 may be a café style motorcycle, an off road motorcycle, a touring motorcycle or any other type of motorcycle. The floor panel 12 has a top surface 18, a bottom surface 20, a rear end 22 and a front end 24, and the longitudinal axis extends through the rear end 22 and the front end 24. Additionally, the bottom surface 20 rests on the support surface 14 and the motorcycle 16 rests on the top surface 18.

A shell 26 is provided and the shell 26 is divided into a rear portion 28 that is hingedly coupled to a front portion 30, and the front portion 30 is attached to the floor panel 12. The rear portion 28 is positionable in an open position to facilitate the motorcycle 16 to be driven onto the floor panel 12. Additionally, the rear portion 28 is positionable in a closed position to enclose the motorcycle 16 on the floor panel 12. The shell 26 is comprised of a rigid material, including but not being limited to, a preformed plastic polymer, fiberglass or any other type of rigid material that is resiliently formable into a pre-determined shape. In this way the shell 26 protects the motorcycle 16 from impact damage. Moreover, the shell 26 is comprised of a fluid impermeable material to protect the motorcycle 16 from moisture.

The shell 26 has a bottom edge 32 and an exterior wall 34, and the exterior wall 34 is convexly arcuate with respect to the bottom edge 32 such that the exterior wall 34 defines an interior space 36 for enclosing the motorcycle 16. The bottom edge 32 has a front side 38, a back side 40, a first lateral side 42 and a second lateral side 44. The exterior wall 34 has a cut 46 extending between the first lateral side 42 and the second lateral side 44 to define the rear portion 28 and the front portion 30 of the shell 26. Moreover, the cut 46 is positioned closer to the front side 38 than the back side 40.

The bottom edge 32 corresponding to the front portion 30 is coupled to the top surface 18 of the floor panel 12 having the bottom edge 32 being coextensive with an outer edge of the floor panel 12. The exterior wall 34 is formed into a pre-determined shape by manufacturing process such that the exterior wall 34 has curvature and structural features that conform to a profile of the motorcycle 16. The cut 46 has a first edge 48 and a second edge 50 each being associated with a top side 51 of the exterior wall 34. The first edge 48 is associated with the rear portion 28, the second edge 50 is associated with the front portion 30 and the first edge 48 is hingedly coupled to the second edge 50.

The rear portion 28 angles upwardly from the front portion 30 and the rear portion 28 is spaced from the floor panel 12 when the rear portion 28 is positioned in the open position. The rear portion 28 rests on the floor panel 12 having the cut 46 being closed when the rear portion 28 is in the closed position. Additionally, the exterior wall 34 corresponding to the rear portion 28 has an air vent 52 extending therethrough to ventilate the interior space 36 of the shell 26. A gasket 54 is coupled and is coextensive with the bottom edge 32 corresponding to the rear portion 28 of the shell 26. Additionally, the gasket 54 extends along the first edge 48 of the cut 46. The gasket 54 forms a fluid impermeable seal with the floor panel 12 and with the second portion of the shell 26 when the first portion is in the closed position. In this way the gasket 54 inhibits moisture from passing into the shell 26.

A biasing unit 56 is coupled between the rear portion 28 and the front portion 30 of the shell 26. The biasing unit 56 is biased into an extended position for biasing the rear portion 28 into the open position. Conversely, the biasing unit 56 is compressible into a retracted position for closing the rear portion 28. The biasing unit 56 may comprise a gas charged piston, a spring loaded actuator or any other type of similar biasing unit.

An engagement 58 is coupled to and extends upwardly from the top surface 18 of the floor panel 12 and the engagement 58 is aligned with the rear end 22 of the floor panel 12. The engagement 58 has a slot 60 extending therethrough and the slot 60 is oriented to extend along a vertical axis. A closure 62 is rotatably coupled to the rear portion 28 of the shell 26 and the closure 62 is extendable through the slot 60 when the first shell 26 is in the closed position. The closure 62 is rotatable into a locking position having the closure 62 being oriented to extend along a horizontal axis thereby inhibiting the closure 62 from passing through the slot 60. The closure 62 is rotatable into an unlocking position having the closure 62 being oriented to extend along a vertical axis thereby facilitating the closure 62 to pass through the slot 60. In this way the rear portion 28 of the shell 26 is retained in the closed position for protecting the motorcycle 16.

In use, the rear portion 28 of the shell 26 is positioned in the open position and the motorcycle 16 is rolled onto the platform until a front wheel 64 of the motorcycle 16 is positioned in the front portion 30 of the shell 26. The rear portion 28 of the shell 26 is positioned in the closed position to fully enclose the motorcycle 16. The closure 62 is extended through the engagement 58 for locking the rear portion 28 in the closed position. In this way the shell 26 protects the motorcycle 16 from impact damage, weather elements and sunlight.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A hard-shell motorcycle cover assembly being configured to enclose a motorcycle for protective storage, said assembly comprising:

a floor panel being positionable on a support surface thereby facilitating a motorcycle to be rolled onto said floor panel, said floor panel being longitudinally elongated wherein said floor panel is configured to accommodate a full length of the motorcycle;

a shell being divided into a rear portion being hingedly coupled to a front portion, said front portion being attached to said floor panel, said rear portion being positionable in an open position wherein said shell is configured to facilitate the motorcycle to be driven onto said floor panel, said rear portion being positionable in a closed position wherein said shell is configured to enclose the motorcycle on said floor panel, said shell being comprised of a rigid material wherein said shell is configured to protect the motorcycle from impact damage, said shell being comprised of a fluid impermeable material wherein said shell is configured to protect the motorcycle from moisture, said shell having a bottom edge and an exterior wall, said exterior wall being convexly arcuate with respect to said bottom edge such that said exterior wall defines an interior space for enclosing the motorcycle, said bottom edge having a front side, a back side, a first lateral side and a second lateral side, said exterior wall having a cut extending between said first lateral side and said second lateral side to define said rear portion and said front portion of said shell, said cut being positioned closer to said front side than said back side wherein a rearward edge of said front portion is configured to be positioned between a front wheel of the motorcycle and a front bottom edge of a frame of the motorcycle, the cut extending perpendicularly up from the floor panel and being curved such that the front portion of said shell is configured to extend forwardly from the handlebars of the motorcycle when the motorcycle is positioned on the floor panel; and a biasing unit being coupled between said rear portion and said front portion of said shell, said biasing unit being biased into an extended position for biasing said rear portion into said open position, said biasing unit being compressible into a retracted position for closing said rear portion.

2. The assembly according to claim 1, wherein said bottom edge corresponding to said front portion is coupled to a top surface of said floor panel having said bottom edge being coextensive with an outer edge of said floor panel, said exterior wall being formed into a pre-determined shape by manufacturing process such that said exterior wall has curvature and structural features that conform to a profile of the motorcycle.

3. The assembly according to claim 1, wherein said cut has a first edge and a second edge each being associated with a top side of said exterior wall, said first edge being associated with said rear portion, said second edge being associated with said front portion, said first edge being hingedly coupled to said second edge.

4. The assembly according to claim 3, wherein said rear portion angles upwardly from said front portion having said rear portion being spaced from said floor panel when said rear portion is positioned in said open position, said rear portion resting on said floor panel having said cut being closed when said rear portion is in said closed position.

5. The assembly according to claim 1, wherein said exterior wall corresponding to said rear portion has an air vent extending therethrough wherein said air vent is configured to ventilate said interior space of said shell.

6. The assembly according to claim 1, further comprising an engagement being coupled to and extending upwardly from a top surface of said floor panel, said engagement being aligned with a rear end of said floor panel, said engagement having a slot extending therethrough, said slot being oriented to extend along a vertical axis.

7. The assembly according to claim 6, further comprising a closure being rotatably coupled to said rear portion of said shell, said closure being extendable through said slot when said first shell is in said closed position, said closure being rotatable into a locking position having said closure being oriented to extend along a horizontal axis thereby inhibiting said closure from passing through said slot, said closure being rotatable into an unlocking position having said closure being oriented to extend along a vertical axis thereby facilitating said closure to pass through said slot.

8. A hard-shell motorcycle cover assembly being configured to enclose a motorcycle for protective storage, said assembly comprising:

a floor panel being positionable on a support surface thereby facilitating a motorcycle to be rolled onto said floor panel, said floor panel being longitudinally elongated wherein said floor panel is configured to accommodate a full length of the motorcycle, said floor panel having a top surface, a bottom surface, a rear end and a front end, said longitudinal axis extending through said rear end and said front end, said bottom surface resting on the support surface;

a shell being divided into a rear portion being hingedly coupled to a front portion, said front portion being attached to said floor panel, said rear portion being positionable in an open position wherein said shell is configured to facilitate the motorcycle to be driven onto said floor panel, said rear portion being positionable in a closed position wherein said shell is configured to enclose the motorcycle on said floor panel, said shell being comprised of a rigid material wherein said shell is configured to protect the motorcycle from impact damage, said shell being comprised of a fluid impermeable material wherein said shell is configured to protect the motorcycle from moisture, said shell having a bottom edge and an exterior wall, said exterior wall being convexly arcuate with respect to said bottom edge such that said exterior wall defines an interior space for enclosing the motorcycle, said bottom edge having a front side, a back side, a first lateral side and a second lateral side, said exterior wall having a cut extending between said first lateral side and said second lateral side to define said rear portion and said front portion of said shell, said cut being positioned closer to said front side than said back side wherein a rearward edge of said front portion is configured to be positioned between a front wheel of the motorcycle and a front bottom edge of a frame of the motorcycle, the cut extending perpendicularly up from the floor panel and being curved such that the front portion of said shell is configured to extend forwardly from the handlebars of the motorcycle when the motorcycle is positioned on the floor panel, said bottom edge corresponding to said front portion being coupled to said top surface of said floor panel having said bottom edge being coextensive with an outer edge of said floor panel, said exterior wall being formed into a pre-determined shape by manufacturing process such that said exterior wall has curvature and structural features that conform to a profile of the motorcycle, said cut having a first edge and a second edge each being associated with a top side of said exterior wall, said first edge being associated with said rear portion, said second edge being associated with said front portion, said first edge being hingedly coupled to said second edge, said rear portion angling upwardly from said front portion having said rear portion being spaced from said floor panel when said rear portion is positioned in said open position, said rear portion resting on said floor panel having said cut being closed when said rear portion is in said closed position, said exterior wall corresponding to said rear portion having an air vent extending therethrough wherein said air vent is configured to ventilate said interior space of said shell;

a biasing unit being coupled between said rear portion and said front portion of said shell, said biasing unit being biased into an extended position for biasing said rear portion into said open position, said biasing unit being compressible into a retracted position for closing said rear portion;

an engagement being coupled to and extending upwardly from said top surface of said floor panel, said engagement being aligned with said rear end of said floor panel, said engagement having a slot extending therethrough, said slot being oriented to extend along a vertical axis; and a closure being rotatably coupled to said rear portion of said shell, said closure being extendable through said slot when said first shell is in said closed position, said closure being rotatable into a locking position having said closure being oriented to extend along a horizontal axis thereby inhibiting said closure from passing through said slot, said closure being rotatable into an unlocking position having said closure being oriented to extend along a vertical axis thereby facilitating said closure to pass through said slot.

\* \* \* \* \*